United States Patent [19]

Burke

[11] Patent Number: 4,972,367
[45] Date of Patent: Nov. 20, 1990

[54] SYSTEM FOR GENERATING UNSOLICITED MESSAGES ON HIGH-TIER COMMUNICATION LINK IN RESPONSE TO CHANGED STATES AT STATION-LEVEL COMPUTERS

[75] Inventor: Thomas J. Burke, Chagrin Falls, Ohio

[73] Assignee: Allen-Bradley Company, Inc., Milwaukee, Wis.

[21] Appl. No.: 112,958

[22] Filed: Oct. 23, 1987

[51] Int. Cl.$^5$ ............... G06F 13/00; G06F 12/00
[52] U.S. Cl. ............................ 364/900; 364/920; 364/921; 364/974; 364/962.1; 364/940; 364/940.1; 364/138; 364/141
[58] Field of Search ............... 364/140, 141, 130-134, 364/136, 138, 148, 200 MS, 900 MS

[56] References Cited

U.S. PATENT DOCUMENTS

| | | | |
|---|---|---|---|
| 3,648,244 | 3/1972 | McGee | 364/900 |
| 4,001,785 | 1/1977 | Miyazaki et al. | 364/900 |
| 4,216,528 | 8/1980 | Robertson | 364/200 X |
| 4,319,338 | 3/1982 | Grudowski et al. | 364/900 |
| 4,373,193 | 2/1983 | Haag et al. | 364/900 |
| 4,404,651 | 9/1983 | Grudowski | 364/900 |
| 4,507,735 | 3/1985 | Moorehead et al. | 364/132 X |
| 4,545,013 | 10/1985 | Lyon et al. | 364/200 |
| 4,831,582 | 5/1989 | Miller et al. | 364/900 |

OTHER PUBLICATIONS

Chapter 2, "Communication Concepts", from Allen-Bradley User's Manual 1771-6.5.15.
U.S. Patent Application, Serial No. 928,529, filed Nov. 7, 1986, "Database Access Machine for Factory Automation".

Primary Examiner—Gareth D. Shaw
Assistant Examiner—Paul Kulik

[57] ABSTRACT

In a method for monitoring and collecting data in a multi-tier computer system, a database operation message, referred to as an "open" message is transmitted to a database cache computer with a list of data items in the database cache computer to be monitored on a change-of-state basis. The database cache computer responds by monitoring the data items and returning unsolicited "change data" messages containing only states for data items which have changed over the monitoring period. The change data messages are sent back periodically without the need for polling by a higher-level computer. The monitoring process is terminated by closing data records in the higher-level computer which generates a "close" message to the database computer to terminate the transmission of the change data messages. Also disclosed is a database cache computer and a user interface computer for carrying out the method.

11 Claims, 16 Drawing Sheets

DATA DEFINITION FORM

Tag Name     MOTOR                    Type [BIT]
Description
In Service

———————————————— Parameters ————————————————
Station           CONVEYOR
Address - Read
Address - Write   010 00

Representation:

———————————————— Description ————————————————
Descriptor     conveyor   motor
Primary                              Faceplate
Units                                Format
Range
———————————————— Alarm Parameters ————————————————
Class                                Ack. Required High                  Msg.
Low                   Msg.
                      Deadband 64    63
Type        [■                              < 12 >]

| f1 NEXT TAG |
| f2 PREV TAG |
| f3 COMMIT |
| f4 DELETE |

FIG. 4a

STATION DEFINITION FORM

Tag Name  CONVEYOR       Type  STATION
Description
In Service

─────────────────── Parameters ───────────────────

Access Machine     AM1
Highway Port       02
Station Address    09
Station Type       PLC-2
Tags in Service    YES
Alarms Disabled    YES ─────────────────── Description ───────────────────

Descriptor      conveyor station
Primary                             Faceplate

| f1 NEXT TAG |
| f2 PREV TAG |
| f3 COMMIT |
| f4 DELETE |

─────────────────── Alarm Parameters ───────────────────

Class                               Ack. Required
Comm. Error         Msg.
Not in Run          Msg.
Collection Error    Msg.

64        63
Name         █                              < 10 >

FIG. 4b

CHANGE-OF-STATE TABLE

| ATOM ID | USER ID | DST HST |
|---------|---------|---------|
| . | . | . |
| . | . | . |
| . | . | . |
| . | . | . |

FIG. 7a

| USER ID | ATOM DIR | VALUE |
|---------|----------|-------|
| . | . | . |
| . | . | . |
| . | . | . |
| . | . | . |

RAW DATA QUEUE
(PER DST HST)

FIG. 7b

DATA LINK MESSAGE FORMAT

SYSTEM FOR GENERATING UNSOLICITED MESSAGES ON HIGH-TIER COMMUNICATION LINK IN RESPONSE TO CHANGED STATES AT STATION-LEVEL COMPUTERS

BACKGROUND OF THE INVENTION

1. Field of the Invention

The field of the invention is computer equipment for linking a plurality of machine or process controllers in a factory automation network.

2. Description of the Background Art

In factory automation, more complex functions could be performed and coordinated if the programmable or computerized machines presently used to control mechanical equipment could be connected in a network with each other and with higher-level supervisory computers. Current factory automation plans call for at least two levels of supervisory computers for controlling and coordinating the work of programmable controllers. At a lower level, computers known as cell controlling computers or cell controllers monitor and coordinate actions of a number of station-level computers, such as programmable controllers, numerical controllers, motor drive systems, robot controllers and machine vision systems. At a higher level the cell controllers communicate with factory-level computers.

The connection of computers in a factory automation network requires improved networking capabilities. In Miller et al., U.S. application Ser. No. 928,529, filed Nov. 7, 1986, now U.S. Pat. No. 4,831,582, an entire database is downloaded from a cell controlling computer to an access machine to provide a remote data cache interface between the cell controlling computer and a group of station-level computers. The access machine reduces message traffic for efficient and fast response of the computer hierarchy to conditions occurring on the factory floor. The cell controlling computer is tied to the access machine through a data access link. The cell controlling computer may execute various application programs which require data from widely distributed individual stations. The access machine collects data from the programmable machines on the factory floor and reorganizes it, so that one pair of database operation messages, referred to as a "GET" message pair, may be communicated on the data access link to obtain the data that has been collected from a number of computers and controllers located at various stations along an assembly line. Thus, the cell controlling computer is relieved of a great deal of data collection activity, and this allows for improved performance of its application programs and user interface functions.

The cell controlling computer includes a monitor and keyboard where a human operator or user can enter parameters to control the operation of the cell controlling computer and the access machine. When certain records in the database are opened for observation of data, the cell controlling computer will generate "GET" messages as needed to update the relevant data on a periodic basis.

The "GET" message is in essence a polling message from the cell controlling computer to the database cache computer. The sending of the "GET" message to the database cache computer prompts the database cache computer to send the requested data in a reply message to the cell controlling computer. The "GET" message does not distinguish between data that has changed since the last polling of the database cache computer and data that has not changed in that interval. The response time of the system is measured in terms of detecting new values for data items that have changed during a monitoring period. The inclusion of unchanged data in the "GET" return message, as well as the polling nature of the "GET" message, slows the response time of the system.

SUMMARY OF THE INVENTION

The invention is related to a database cache computer for connection in a factory automation cell that includes a cell controlling computer and a plurality of station-level computers located at a corresponding plurality of stations.

The database cache computer includes a mechanism for storing a database of data items collected from the respective station-level computers; a mechanism for communicating the data items through a first communication link with the cell controlling computer via messages which include data items from a plurality of station-level computers; and a mechanism for collecting the data items through a second communication link from the station-level computers.

The present invention provides a further mechanism which is responsive to a first message from the cell controlling computer to designate certain data items in its database as being subject to change-of-state data collection. This mechanism is able to detect changes in values of the designated data items, and is responsive to these changes to periodically generate unsolicited messages to the cell controlling computer. The unsolicited messages include the changed states for the data items subject to "change-of-state" monitoring.

In a further aspect of the invention a monitoring period is based on a time period or the acquisition of a defined number of data items for which values have changed during the monitoring period, whichever occurs first.

The invention reduces message traffic between the cell controlling computer and the database cache computer because only data that has changed, along with associated identifying data, is sent back to the cell controlling computer. Once the change-of-state function is enabled in the database cache computer, the messages are sent back on an unsolicited basis, i.e. no further messages from the cell controlling computer are necessary to prompt the return of data.

The change-of-state message feature in the database cache computer can be initiated through an "OPEN" message transmitted from the cell controlling computer to the database cache computer. The change-of-state message feature can be terminated through a "CLOSE" message transmitted from the cell controlling computer to the database cache computer.

Other objects and advantages besides those discussed above shall be apparent to those with experience in the art from the description of a preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 4a shows the screen of the video monitor of FIG. 1 as a new data record is being entered into the cell controlling computer of FIG. 1;

FIG. 4b shows the screen of the video monitor of FIG. 1 as a new station record is being entered into the cell controlling computer of FIG. 1;

FIGS. 7a and 7b are diagrams of certain data structures used in the access machine to implement change-of-state data monitoring;

DETAILED DESCRIPTION OF THE PREFERRED EMBODIMENT

Figure 1:
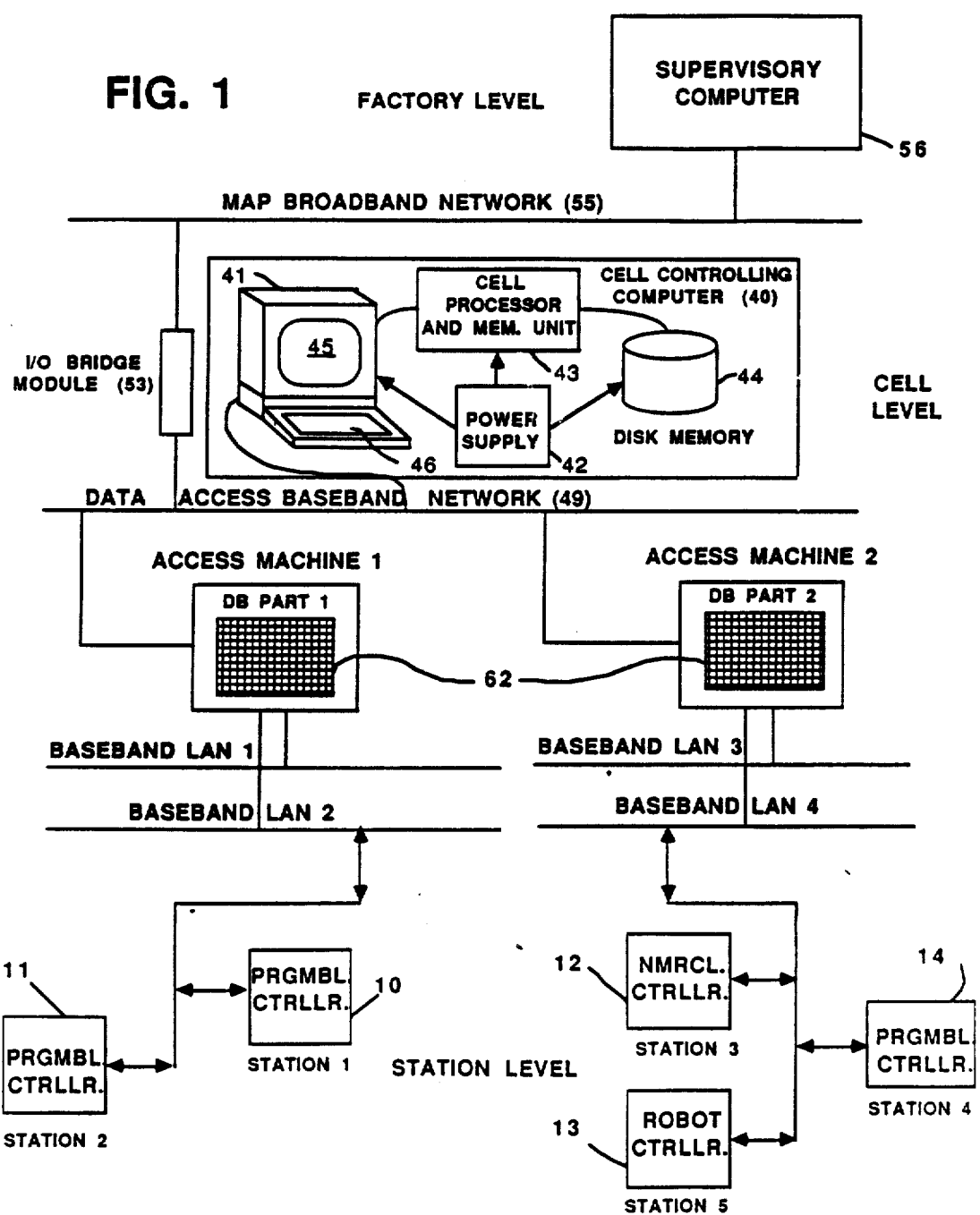
FIG. 1 is a block diagram showing the management of data items in a factory cell automation system that incorporates an access machine of the present invention.

The invention is incorporated as an enhancement to a method and apparatus first disclosed in Miller et al., U.S. Pat. application Ser. No. 928,529, filed Nov. 7, 1986 now U.S. Pat. No. 4,831,582. That document describes a hierarchical, multi-tier computer system of the type shown in FIG. 1. Such a system includes one or more station-level computers such as programmable controllers 10, 11, and 14, numerical controller 12 and robot controller 13. All of these station-level computers control machines and other electromechanical devices. Although not shown, station-level computers such as graphics interface stations and machine vision systems could also be connected as station-level computers. Thus, station-level computers other than machine controlling computers could be used with the invention.

The station-level computers communicate with a cell controlling computer 40 through one or more database access machines referred to as ACCESS MACHINE 1 and ACCESS MACHINE 2. The station-level computers are typically located at "remote" stations throughout a factory. By "remote" it is meant that the stations are usually at least 50 feet or more away from the cell controlling computer, and therefore, networks using serial data communication rather than parallel data communication are used.

The cell controlling computer 40 is a computer for supervising, monitoring and coordinating the activities of the station-level computers. It is also a computer with a user interface including a video monitor and keyboard by a which a human operator can direct and verify certain operations of the cell control system. The access machine computers are "cache" computers for storing a database that interfaces the cell controller-access machine communication link to local networks of station-level computers.

The cell controlling computer 40 may also be connected for communication to a factory-level supervisory computer 56 through an I/0 bridge module 53, and this supervisory computer 56 may be of the mainframe or minicomputer class.

The cell controlling computer 40 includes a work station 41, a power supply unit 42, a cell processor and memory unit 43 and a hard disk memory unit 44. These units 41-44 are housed in separate enclosures. The control center or brain of the cell computer system is the cell processor and memory unit 43. This unit 43 contains processor and memory modules. Within the processor module is a microelectronic CPU from the 68000 Series of CPU's manufactured by Motorola, Inc. of Phoenix, Ariz., and Austin, Tex. The memory modules include random access memory (RA) circuits with a total of eight megabytes (8 Mb) of storage capacity. The work station 41 and the hard disk memory unit 44 are peripherals connected to the cell processor and memory unit 43. The power supply unit 42 provides power to the other units in the system. The work station 41 includes a color video monitor 45 and a separate keyboard 46 and mouse (not shown). The hard disk memory unit 44 provides seventy-one megabytes (71 Mb) of storage capacity and is useful for saving application programs, databases and other data files and reloading these items into the 8-megabyte RAM on startup.

The cell controlling computer 40 is compatible with the Series 5400 Computer Systems available from Massachusetts Computer Corporation, Westford, Mass. It runs under the UNIX operating system available from AT&T Bell Laboratories, Short Hills, N.J.

The cell controlling computer 40 is connected through a data access baseband network 49 to ACCESS MACHINE 1 and ACCESS MACHINE 2. The baseband network 49 is a carrier sense multiple access/collision detection (CSMA/CD) type as specified in IEEE Std. 802.3. The network 49 is connected through an I/O bridge module 53 to a broadband network 55 conforming to the MAP protocol as specified to date and conforming to IEEE Std. 802.4 for a token-passing bus network. Through the MAP network 55, the cell controlling computer is connected to the factory level supervisory computer 56.

An analogy can be drawn between the access machines and a large group of pigeonholes such as those used in an old post office. Station-level devices insert and retrieve information (data, messages, graphic images) from one side of the pigeonholes on a schedule determined by the needs of machines or processes being controlled. The cell controlling computer 40 inserts and retrieves information from the other side of the pigeonholes on a different schedule determined by the needs of the human interfaces and higher level computers connected through the cell controlling computer 40. Each pigeonhole represents a unique location in the database.

The access machines allow the system database to be distributed outside of the cell controlling computer 40. The access machines shall also be referred to herein as database "cache" computers. The cell controlling computer 40 handles communications with the user through the work station 41, which includes the video monitor 45, the keyboard 46 and the mouse (not shown), while the access machines handle data collection from the remote stations.

A system database 62 is stored in the disk memory 44 of the cell controlling computer 40 and upon startup, is downloaded to ACCESS MACHINE 1. In this example, the system database 62 is distributed to the two access machines, so that PART 1 of the system database 62 is downloaded and stored in ACCESS MACHINE 1 and PART 2 of the system database 62 is downloaded and stored in ACCESS MACHINE 2.

The station-level computers 10, 11 and 14 are connected to ACCESS MACHINE 1 and ACCESS MACHINE 2 through baseband local area networks (LAN's), referred to as BASEBAND LAN 2 and BASEBAND LAN 4 in the drawing. The preferred networks are offered under the trade designation Data Highway TM by Allen-Bradley Company, Inc. of Highland Heights, Ohio.

Although not shown in the drawings it will be understood by those familiar with the art that network interface modules are included in the station-level computers. For a description of the construction and operation of these networks and network interface modules, reference is made to Grudowski et al., U.S. Pat. No. 4,319,338, issued Mar. 9, 1982, and commercial literature available from Allen-Bradley Company, Inc. on the Data Highway TM networks and network interface modules, including in particular, Bulletin 1771-6.5.15 (1985).

During startup operations, the database 62 is downloaded in parts from the cell controlling computer 40 to ACCESS MACHINE 1 and ACCESS MACHINE 2. As operations continue, database operations messages are transmitted over the data access baseband network 49. The content of these messages is substntially different from the character of the network messages transmitted over the BASEBAND LAN's.

Figure 2:
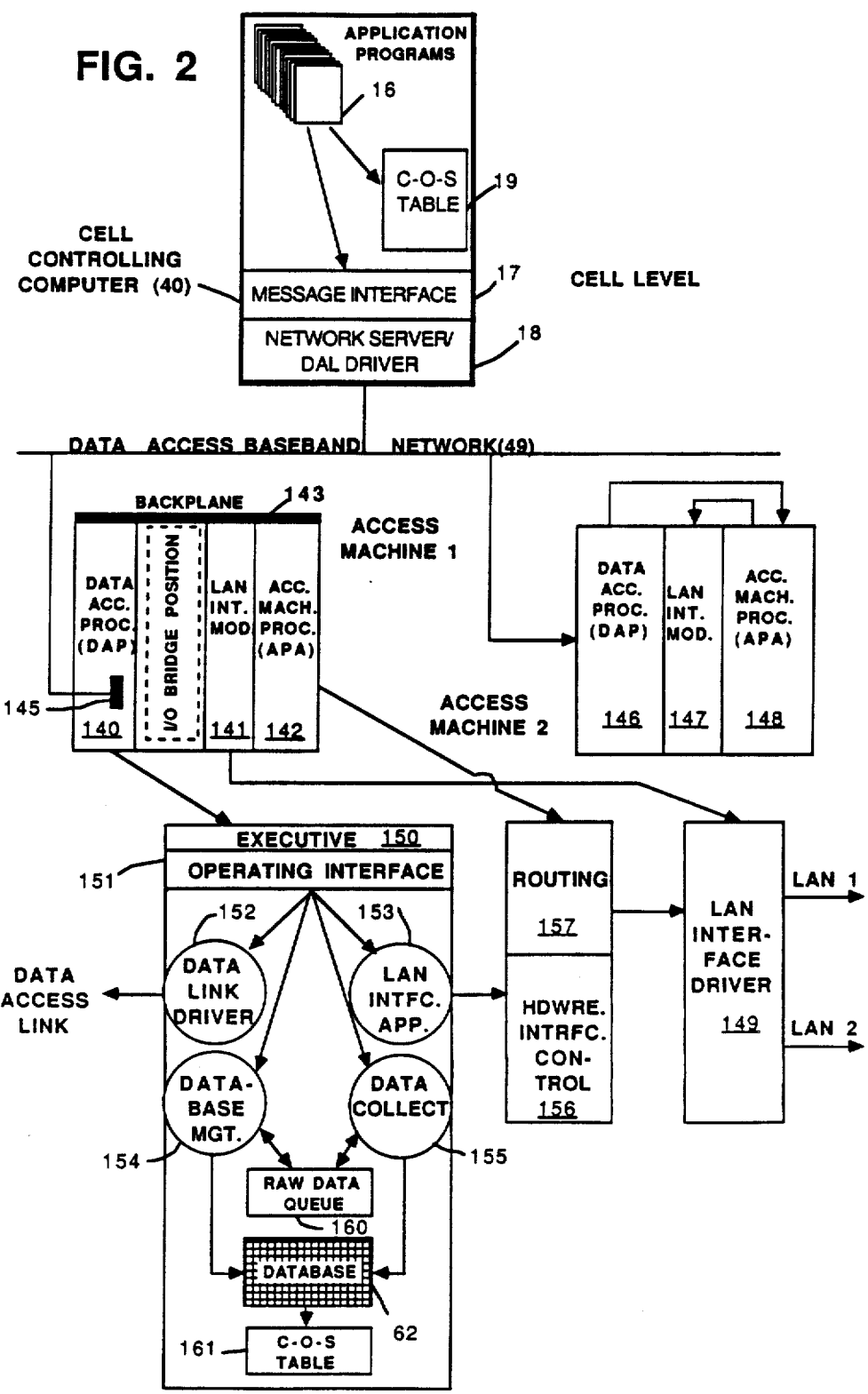
FIG. 2 is a hardware-firmware schematic showing the architecture of the cell controlling computer and the access machine of FIG. 1.

FIG. 2 shows the organization of the programs and data in the cell controlling computer 40 which are related to the present invention. One or more application programs 16 are designed by a user to communicate with the database 62 that resides in the access machines. To communicate with the database 62 after it has been downloaded, the application programs 16 send software messages through a message interface module 17 to a network server module 18. The network server module 18 calls a data access link (DAL) driver subroutine to convert software messages to the protocol necessary to transmit the messages across the data access baseband network 49.

In prior cell controller-access machine systems, database operations messages such as "GET" and "PUT" were generated by user applications to read and write groups of tag-referenced items from the database 62. In the present invention these have been superseded by "OPEN" messages for designating certain tag-referenced atoms as change-of-state atoms and by "CLOSE" messages for removing this designation. The "OPEN" messages are generated when data is opened in an application for viewing on the video monitor 45 of the work station 41. The "CLOSE" messages are generated when the data is closed in an application and is no longer ready for viewing on the video monitor 41.

Figure 3:
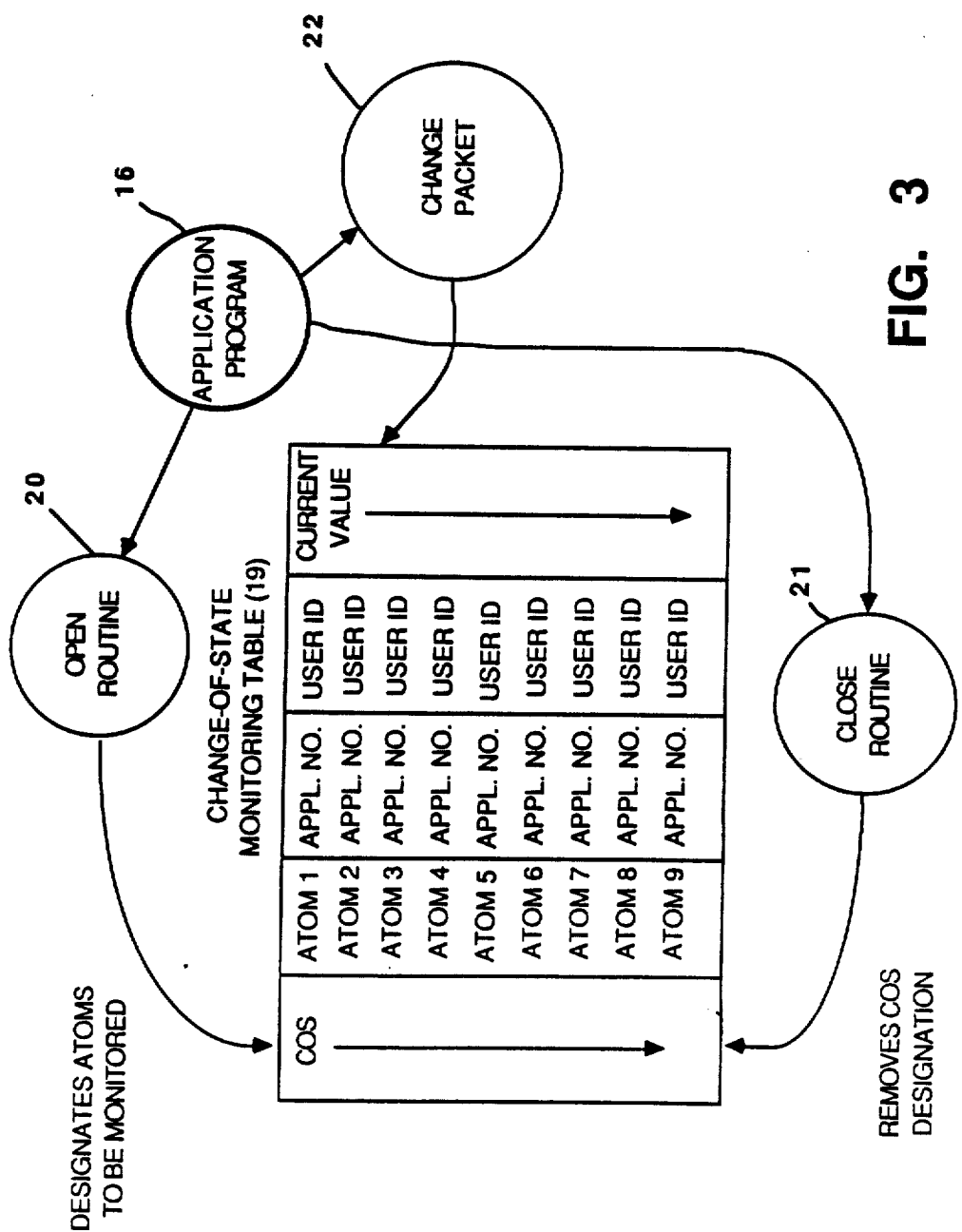
FIG. 3 is a bubble diagram showing aspects of the organization of programs and data in the cell controlling computer of FIG. 1.

When data is opened for monitoring, the atoms of data that are subject to monitoring on a change-of-state basis are designated as such in a C-0-S table 19 in the cell controlling computer 40. As seen in FIG. 3, the C-0-S table 19 includes a list of tag-referenced atoms (ATOM 1 - ATOM 9) in the database 62, together with an associated application number and a user ID number for each atom. The user ID number is assigned so that a user can call up a list of atoms by a numbered sequence rather than listing a set of tag symbols. When an application program 16 is executed to designate various atoms as subject to change-of-state collection techniques, the application program 16 calls an "OPEN" routine 20 which adds a change-of-state status field to each atom-level record in the C-0-S table 19.

The change-of-state data is received from the access machines in database operations messages. This data is held at the message interface 17 in FIG. 2 until the application is ready to receive it. When the application program 16 is ready to receive data from the message interface 17, it generates a change packet request to the message interface module 17. This causes the message interface module 17 to return a change packet of data 22 with initial or current values for atoms and these values are placed in the C-0-S table 19. It should be noted here that the above-mentioned change packet request occurs completely within the cell controlling computer 40. As shall be explained later herein, the "OPEN" message is passed from the cell controlling computer 40 to the access machines, and the return of data in response to this "OPEN" message is on a periodic and unsolicited basis.

When an application program 16 is ready to terminate the change-of-state collection technique, the application program 16 calls a "CLOSE" routine 21 which removes the change-of-state status field for each applicable atom-level record in the C-0-S table 19. Thus, the user is provided with a means to initiate and terminate the change-of-state mode of communication that will ensue between the cell controlling computer 40 and the access machines.

On startup the database 62 is downloaded from the cell controlling computer 40 of FIGS. 1 and 2 to ACCESS MACHINE 1 and ACCESS MACHINE 2. To communicate with the database 62 after it has been downloaded, the application programs 16 send software messages through a message interface module 17 to a network server module 18. The network server module 18 calls a data access link (DAL) drive subroutine to convert software messages to the protocol for transmitting the messages across the data access baseband network 49. For further details concerning this aspect of the cell controller 40, reference is made to U.S. application Ser. No. 928,529 filed Nov. 7, 1986.

As seen in FIG. 2, ACCESS MACHINE 1 has four circuit modules which are supported in an equipment rack (not shown). The equipment rack includes a backplane motherboard 143 with electrical connectors that receive mating connectors on three modules, a data access processor (DAP) module 140, a local area network (LAN) interface module 141 and an access machine processor (APA) module 142. The DAP module 140 has a connector 145 on its front side that connects to the data access baseband network 49. The other module in the rack is the I/O bridge module 53, which is supported in the rack in the position outlined in phantom, but which is not connected to the backplane 143.

ACCESS MACHINE 2 also has a DAP module 146, and LAN interface module 147 and an APA module 148 which are identical to the modules 140-142 in ACCESS MACHINE 1. A second I/O bridge module 53 is not needed for ACCESS MACHINE 2.

FIG. 2 also shows the organization of the programs in the modules 140-142 of ACCESS MACHINE 1, and this is the same for ACCESS MACHINE 2. The DAP module 140 includes a microelectronic CPU from the 68000 Series available from Motorola, Inc. of Phoenix, Ariz. and Austin, Tex. This component is the central controlling element or brain of the DAP module 140. The highest level program component is a multi-tasking executive program 150 and a number of these are available from commercial sources for the various models of microelectronic CPU's. The particular one used in this embodiment is available under the trade designation C-EXEC from JMI Software Consultants, Spring House, Pa.

The executive program 150 is interfaced to four other program modules 152-155 through an operating interface module 151. The first two modules 152, 153 perform the communication tasks to be described, while the second two modules 154, 155 execute tasks for collecting, managing and accessing data in the database 62.

The DAP module 140 includes a 2-megabyte dynamic RAM which receives and stores the database 62 and program modules 150-155 which are downloaded from the cell controlling computer 40 on startup. The speed of the access machines is maximized by executing programs and operating on data in RAM memory.

The data link drive module 152 provides instructions for handling communication of messages over the data access baseband network 49. The LAN interface application module 153 communicates message information that is transmitted over the BASEBAND LAN 1-4 networks, but first the information is transmitted through the APA module 142 and the LAN interface module 141. The BASEBAND LAN 1-2 networks connect to the LAN interface module 141. The APA hardware module 142 includes firmware in the form of a hardware interface control module 156 and a routing module 157 for routing messages to stations on the two networks connected to the LAN interface module 141. The LAN interface module 141 is organized along two parallel data paths, one for each BASEBAND LAN, and includes LAN interface driver firmware 149. For further details of the construction of the modules in the access machine, reference is made to U.S. Pat. application Ser. No. 928,529 filed Nov. 7, 1986.

The application programs 16 shown in FIG. 2 use the input formats shown in FIGS. 4a and 4b. When data is entered through the keyboard 46 and video display 45, the user application program 16 generates "OPEN" and "CLOSE" messages and change packet requests as described earlier. Some typical records that would be entered to generate an "OPEN" message to the database 62 are illustrated in FIG. 4a.

One by one the field or "atom" labels are highlighted on the screen. The name of the highlighted field ("TYPE") appears next to a cursor field 63 at the bottom of the screen 45, where letters are typed as a cursor 64 moves from left to right to indicate the location of the next letter. Also shown in the cursor field 63 between the symbols "< >" is the number of characters allowed in the field. When the information has been entered and verified to the satisfaction of the user, the "f3 COMMIT" command is entered to add the record to the files in the database 62.

As seen in FIG. 4a, the fields or atoms for each data record are grouped in four sections which include a general section, a parameter section, a description section and an alarm parameter section. Within the general section, for example, there are fields for tag name, data type, a textual description and "in service" status. A tag name such as "MOTOR" is assigned to the data record and applies to the atoms in the record. Some of the various "types" of data for the next field are BIT, NUMBER and TEXT. A logical bit in the memory of the programmable controller 11, would be of the BIT data type. An accumulated value for a timer would be a NUMBER data type. Data that is transmitted in ASCII format to be displayed on the screen 45 of the work station 41 as an English-language phrase would be of the TEXT data type.

A record is also generated for each station in the system and the screen format for creating such a record is seen in FIG. 4b. The station also receives a tag name, which in this example is CONVEYOR This tag is identified as a station tag by the term STATION that is entered in the "Type" field. Other fields for the station record are grouped within a parameter section, a description section and an alarm parameter section. It should be noticed that the station tag is also entered as one of the parameter fields in FIG. 4a for creating data records.

Figure 5:
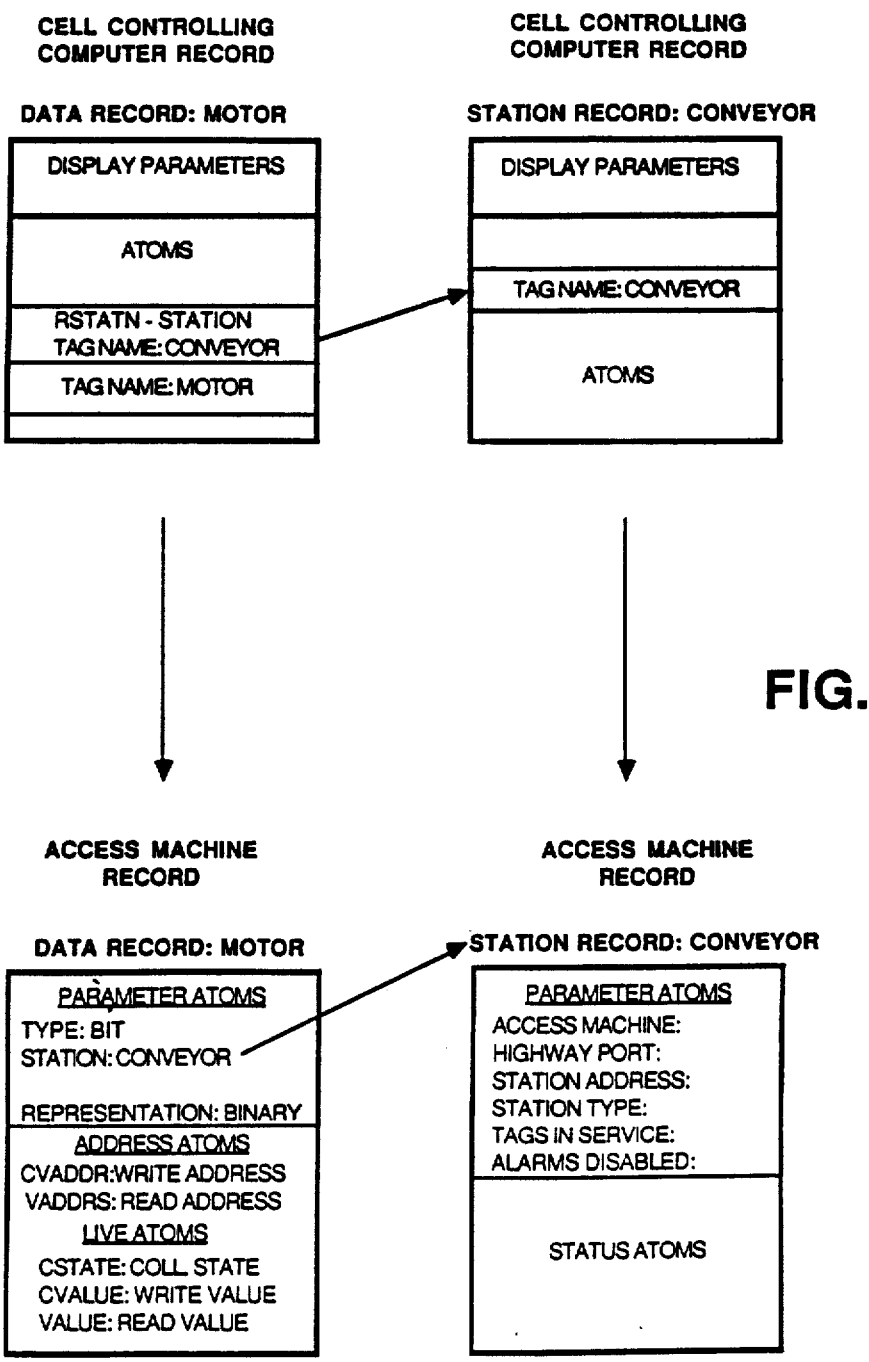
FIG. 5 is a map diagram showing the relationship of certain records in the database which is downloaded from the cell controlling computer to the access machine of FIG. 1.

FIG. 5 shows how the station tag identifier is used to relate the station record to all of the records for data items at a particular station. A tag name such as MOTOR has been entered to identify one of the data records. The station identifier "CONVEYOR" has been entered as a parameter atom in the data record. In this way all data records for a station can be related to the station and to the information in the station record without repeating the station information in each data record.

FIG. 5 also shows how the information entered in the forms of FIGS. 4a and 4b is stored in the database in both the cell controlling computer 40 and the access machines. Generally, records contain a number of fields, which are also referred to as "atoms". The following is a list, in alphabetical order, with short descriptions, of the some of the atoms commonly found in the various types of records which shall be discussed later. In these descriptions, the term "data item" refers to an item of data at one of the stations, which finds a corresponding atom in one of the data records.

CSTATE Atom—this atom is a read-only atom which indicates certain status information about a data item, such as whether the data item has been updated the first time, whether the data item is being updated at the desired rate, and whether the data is valid.

CVADDR Atom—this atom represents the remote station table address of the CVALUE (command value) atom.

CVALUE Atom—this atom represents a command value that can be written to a data item.

INSERV Atom—this atom is a bit-oriented, two-state atom that signals whether the data item is operational.

RATE Atom—this atom is a code representing a scan class category for updating the data item.

RMTFMT Atom—this atom indicates the numbering system in which the data is represented, such as 3-digit BCD, 16-bit unsigned binary, single-bit binary, ASCII code or one of the representations used for timers and counters in programmable controller 11.

RSTATN Atom—this atom is a tag name of the network station from which the data item is to be collected. This atom is applicable only to station-level records.

TAG Atom—this is the data item global identifier and a data record identifier.

TYPE Atom—this atom is a description of the type of data identified by the TAG atom. This description may be at the data item level such as the types BIT, TIMER or TEXT, or the description may be at a system level such as STATION, ACCESS MACHINE or CELL CONTROLLING COMPUTER.

VADDRS Atom—this is a station data table address for the VALUE atom.

VALUE Atom—this atom is either a default value or the collected value for a data item.

As seen in FIG. 5, each data record in the cell controlling computer 40 includes display parameters for viewing the record on the video monitor 45 of the work station 41. These display parameters include the fields seen in the "Description" section of the screen seen in FIG. 4a. This information is not needed by the access machines, so it is not downloaded with the other data in the record.

The data entered in the fields in the "Parameters" section of the screen seen in FIG. 4a, relates to the record as it is used in the access machines to collect data from the stations. These data become the parameter atoms such as data type (e.g. BIT, NUMBER ), the station identifier (CONVEYOR), and the form of alphanumeric representation (e.g. BINARY, 3-digit BCD), which are seen in the access machine record in FIG. 5. In addition, the record in the access machine may include a READ address and a WRITE address, so that data can be read from one address at a station and written to another. The read and write addresses can be the same.

The records in both the cell controlling computer 40 and access machines contain a number of active fields or "live" atoms, which may be modified in real time response to changing conditions on the controlled equipment. The live atoms are those such as the collection state (CSTATE) atom, the write value (CVALUE) atom and the read value (VALUE) atom.

The station records in the cell controlling computer 40 also contain atoms for the description fields seen in FIG. 4b and these are not needed by the access machines. The parameter atoms for a station record are somewhat different than for a data record as seen in FIG. 5. The parameter atoms include an identifier for the access machine connected to the station, the network port to which the station is connected, the station address, the station type, a tags "in or out of service" atom and an alarms enabled/disabled status atom. The other atoms in the station record may also be considered to be status atoms. The station record does not include "live" atoms.

Figure 6:
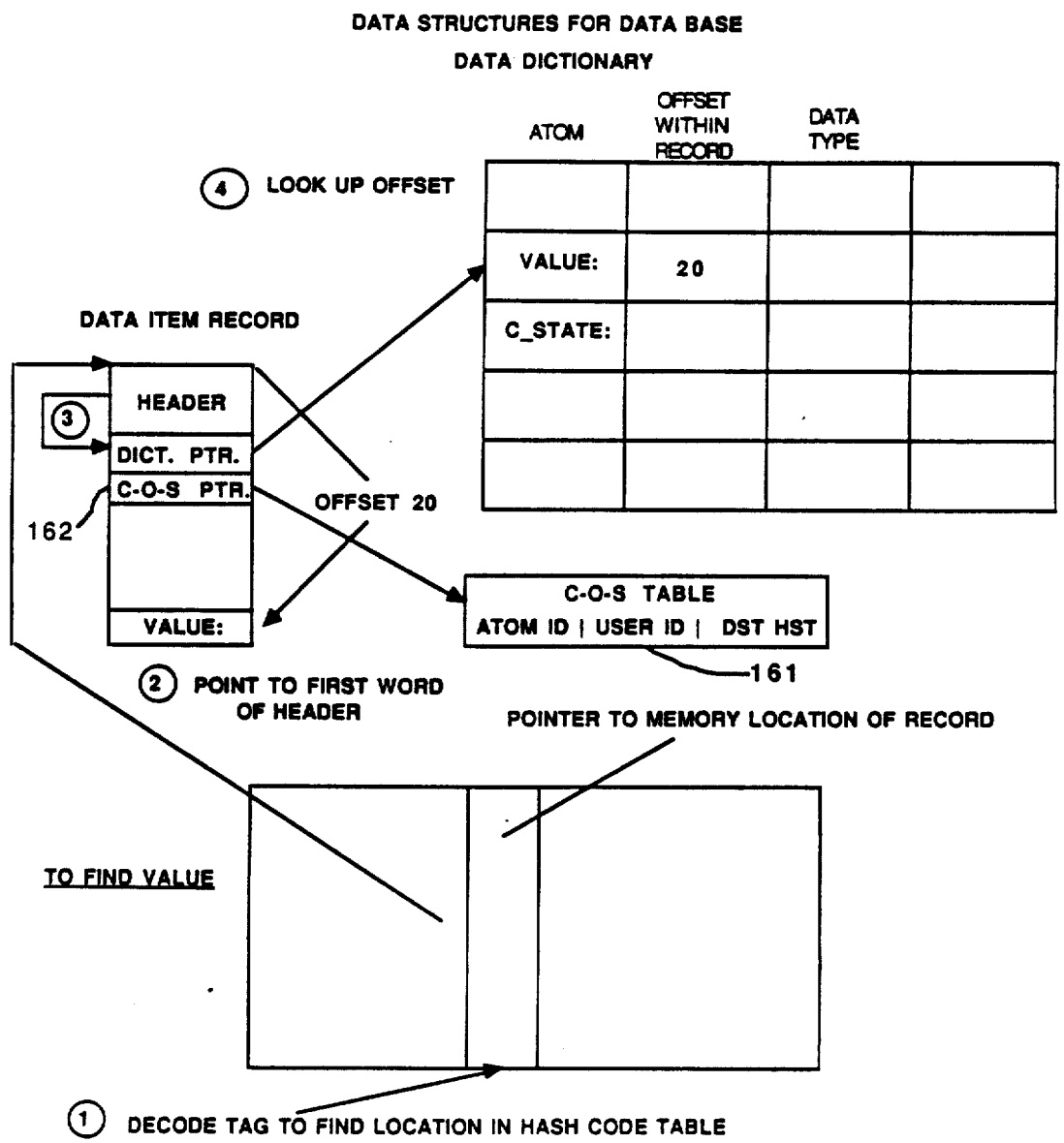
FIG. 6 is a map diagram showing the organization of data records in a database residing in the access machine of FIGS. 1 and 2.

FIG. 6 illustrates the manner in which the data item records are organized and accessed in the database 62. A mathematical function of the type known in the art as a "hash function" is applied to the tag reference associated with each atom to generate a computed memory address in a hash code table seen in FIG. 6. At this address a pointer or second address is stored and this address is the address of the first data word in the record. The data record has a header with a pointer (in this case a number representing an offset from the first data word) to a data dictionary pointer. A data dictionary is provided for each "type" of record, such as BIT, NUMBER or STATION, and this dictionary is stored in another location in memory and linked through the data dictionary pointers to the numerous records of its specific type. The data dictionary includes a list of the atoms in a particular type of record and their location (by offset from the beginning of the record) within the record. The data dictionary may also include other information about the atom such as atom type. The atom identifiers are used to look up the offsets to atom locations in the data dictionary. The offsets are then used to find the atom values which are stored in the data record.

Hashing allows records to be added to memory in a mathematical though non-contiguous and non-consecutive fashion. It is thus possible to insert a new record in the database 62, and give it the appearance of being related to a consecutive system of station-level addresses, while in fact storing and retrieving the record from a random location in memory.

As mentioned earlier, there are different types of records according to the TYPE atom. For each type of record the database 62 includes a data dictionary. In the following data dictionaries, certain atoms related to an alarm function have been deleted, as that enhancement is not necessary to the basic invention described herein.

The data dictionary for a system-level data record such as a CELL CONTROLLING COMPUTER 40 would include the following atoms:
ID—cell COntrolling computer number
INSERV—in service bit
TAG—tag name
TYPE—type code
VALUE—status code
AM1TAG—first access machine tag
AM1ALD—first access machine auto-load status
AM1FIL—first access machine auto-load file address
AM2TAG—second access machine tag
AM2ALD—second access machine auto-load status
AM2FIL—second access machine auto-load file address The data dictionary for a system-level data record such as an ACCESS MACHINE would include the following atoms, except that with the present invention the RATE atoms would not be active:
GWLOAD—enable loading of database
ID—access machine number
INSERV—in service bit
RATE 1—scan class 1 in secs.
RATE 2—scan class 2 in secs.
RATE 3—scan class 3 in secs.
RATE 4—scan class 4 in secs.
RATE 5—scan class 5 in secs.
RATE 6—scan class 6 in secs.
TAG—tag name
TYPE—type code
VALUE—status code
DALADR—data access link address The data dictionary for a system-level data record such as STATION would include the following atoms:
AMTAG—access machine tag name
ACK—acknowledgements
DIASTA—diagnostics status HWPORT—network port
INSERV—in service status
RATE—scan class
STADDR—station network address
STYPE—station type
TAG—station tag name
TINSER—station's tag in/out service status
TYPE—type code
VALUE—status code The data dictionary for a data record such of the BIT data type would include the following atoms:
ACK—acknowledgements
CSTATE—collection status
CVADDR—command value address
CVALUE—command value
CVDBNC—command disagree debounce
INSERV—in service status
RATE—scan class
RMTFMT—remote data format
STATN—station tag name
TAG—tag name
TYPE—type code
VADDRS—data table address of VALUE
VALUE—collected value The data dictionary for a data record of the INTEGER data type would include the following atoms:
ACK—acknowledgements
CSTATE—collection status
CVADDR—command or write value address
CVALUE—command or write value
INSERV—in service status
RATE—scan class
RMTFMT—remove data format, including 3-digit, 4-digit and 6-digit BCD and 16-bit signed and unsigned binary
RSTATN—station tag name
TAG—station tag name
TYPE—type code
VADDRS—data table address of VALUE atom
VALUE—collected or read value In a prior cell controller system described in U.S. application Ser. No. 928,529, now U.S. Pat. No. 4,831,582, data was updated in the cell controlling computer 40 by sending polling messages to the access machines, and by sending polling messages from the access machines to the station-level controllers. The present invention and an invention described in an application of Thomas J. Burke filed on even date herewith and entitled "Access Machine for Response to Unsolicited Messages from Station-Level Devices" have removed the need for polling. The principle underlying both of these disclosures is that machines lower in the control hierarchy should be allowed to send data on an unsolicited or unpolled basis. To achieve this objective the organization of the database 62 has been modified.

As seen in FIG. 6, the data records each include a dictionary pointer to the data dictionary for the "type" of record in which data is collected for that item. In the present invention the data records also contain a C-0-S (change-of-state) pointer 162 to a C-0-S (change-of-state) table 161 which is stored in the access machines as part of the database 62. The C-0-S pointer 162 and C-0-S table 161 are set up by execution of the database management program 154 in response to "OPEN" messages from the cell controlling computer 40.

The C-0-S table 161 (seen in greater detail in FIG. 7a) has an entry for each atom that is designated in the cell controlling computer 40 as being subject to change-of-state collection and monitoring. Each entry includes the atom ID reference and the user ID number. The user ID's are passed to the access machine in the "OPEN" message. In addition, each atom is provided with a destination host identifier that identifies the cell controlling computer 40 to which the data will ultimately be returned. This is provided to allow for systems with multiple cell controlling computers on the data access baseband network.

Another data structure for carrying out the invention is seen in FIG. 7b and is referred to as a "raw data" queue 160. The information in the raw data queue in FIG. 7b is grouped for each destination host which is to receive data from the access machine.

As seen in FIG. 2, the raw data queue 160 is a buffer area in the memory of the data access processor (DAP) module 140. The database management program 154 accesses the raw data queue 160 to obtain updated data values to be sent back to the cell controlling computer 40. Values from the station-level computers that have changed state within a monitoring period are loaded into the raw data queue 160 through execution of the data collection program 155.

Figure 8:
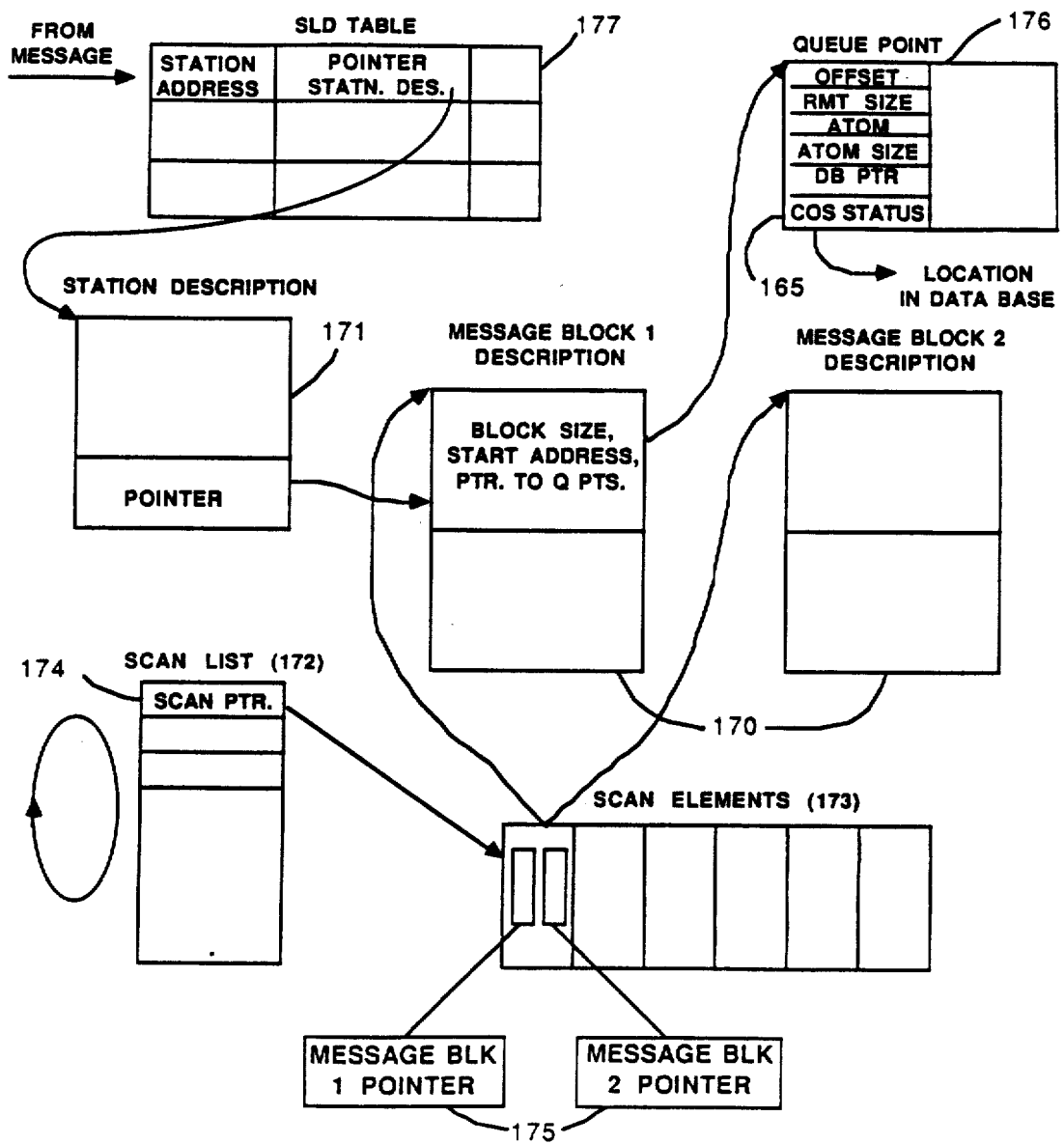
FIG. 8 is a diagram of the data structures used in the collection of data from the station-level computers.

Updated values for atoms are stored in the raw data queue 160 in tabular form as seen in FIG. 7b. Each entry includes the user ID and an atom directory element for the corresponding atom. During data collection, the CPU (processor) in the DAP module 140 executes the data collection program 155 to load the updated values received in the incoming messages into the database as described in U.S. Pat. application Ser. No. 928,529 cited above. As described there the database 62 is accessed through a group of data structures shown generally in FIG. 8 and including in particular a group of queue points 176.

The access machine uses the queue points 176 as a link between messages from the stations and the locations in the database 62. Messages from the stations can be received in one of two modes: (1) a polling mode or (2) an unsolicited mode. For the purpose of understanding the present invention, a brief summary of these modes is sufficient.

In the polling mode, the access machine determines which stations are connected to it and how many atoms in the database 62 must be communicated to each respective station. Depending on this number it sets up one or more message block description data structures 170 per station. Each of these data structures 170 defines a block of data to be transmitted to or from the station over the BASEBAND LAN's Each message block description data structure 170 includes reference data specifying the block size, a starting address in memory and pointers from the atoms in the message block to queue points 176. In order to maximize the data communication rate from the stations and to minimize scan times for updating data, two further data structures, referred to as a SCAN LIST 172 and SCAN ELEMENTS 173 are used in the polling mode. These structures include scan pointers 174 and message block pointers 175. For a further description of the use of these data structures in the polling mode, reference is made to U.S. Pat. application Ser. No. 928,529 now U.S. Pat. No. 4,831,582, cited above.

In the unsolicited mode, the access machine sets up an SLD table 177 which is also linked to the queue points 176. When a message is received in the unsolicited mode, the data is extracted from the message and loaded into the database 62 as described in the copending application of Thomas J. Burke, entitled "Access Machine for Response to Unsolicited Messages from Station-Level Devices "and filed on even date herewith. For further details of this mode of collecting data, reference is made to that application.

Each queue point 176 includes a pointer to a location in the database 62 which includes the particular atom. Other information in the queue point 176 includes an offset pointer to the database pointer, the size of the atom at the remote station (RMT SIZE), the name of the atom (ATOM) and the size of the atom in the database 62 (ATOM SIZE). The queue points 176 are set up when the database 62 is downloaded and when new data items are added to the database 62.

In response to the "OPEN" messages, the processor in the DAP module 140 executes the data management program 154 to add a change-of-state status field 165 to the queue points 176 for those atoms which are subject to change-of-state monitoring. During data collection, the processor in the DAP module 140 executes instructions in the data collection program 155 to check the information in this status field. If a valid change-of-state status is detected, the processor in the DAP module 140 executes further instructions to update the records in the database 62.

To update the database 62, the processor in the DAP module 140 compares the new values received from the stations with the current values in the database 62. If the value has changed, the new value is loaded into the appropriate location in the database 62. If the atom is subject to change-of-state monitoring, the processor then executes further instructions in the data collection program 155 to access the change-of-state table 161 utilizing the C-0-S pointer 162 as seen in FIG. 6. There, the processor uses the atom ID to obtain a user ID for the atom. The processor then executes further instructions to load the user ID into the raw data queue 160 of FIGS. 2 and 7b.

Using the atom ID, the processor in the DAP module 140 also finds an atom directory element in the applicable data record in the database and loads the atom directory element into the entry in the raw data queue 160. The atom directory element contains parameter data describing the type of atom, the size of the atom value data in bytes and the relative location of the specific atom value within a group of atom values subject to change-of-state monitoring. The processor in the DAP module 140 also loads the change-of-state value of the atom into the raw data queue 160.

Changed values are sent back to the cell controlling computer through execution of the data management program 154. During this execution, the processor in the DAP module 140 periodically examines the C-0-S table 161 as it examines data records, to determine whether certain atoms are subject to change-of-state monitoring. If one or more atoms have been opened for change-of-state monitoring, the processor in the DAP module 140 executes instructions to apply a test to determine whether a change packet message 59 should be sent back to the cell controlling computer 40. The test limit is selected as a time interval such as one second or the maximum size of the raw data queue 160 which is thirty-six (36) atom values, whichever occurs first. When the test limit is reached the raw data queue 160 is emptied into a change packet message 59 to be sent back to the cell controlling computer 40.

FIGS. 9 - 13 illustrate the database operations messages which are used to carry out the invention. The operational details of this example are for patent disclosure purposes only. The instructions for operating the equipment described herein under actual conditions will be made available in other specifications and publications of the manufacturer.

Figure 9:
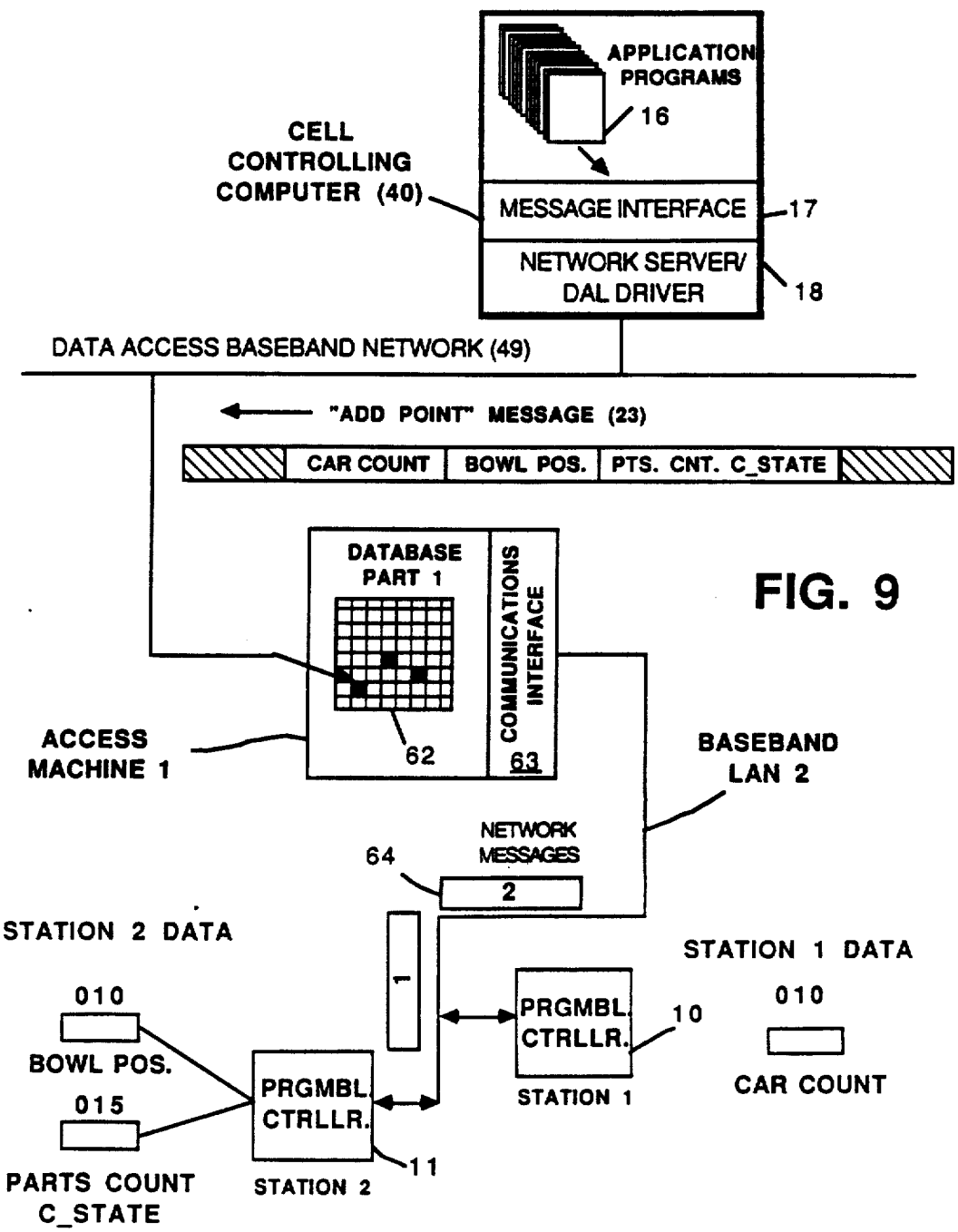
FIG. 9 is a data flow diagram showing the addition of items to the database in the access machine of FIG. 1.

As seen in FIG. 9, it shall be assumed that three data items are to be added to the portion of the database 62 in ACCESS MACHINE 1. These data items are referred to as "CAR COUNT", "BOWL POSITION" and "PARTS COUNT C_STATE".

"CAR COUNT" is an integer value representing a number of cars to pass some type of input device on an assembly line. It shall be assumed that this input device is connected to the programmable controller 10 at Station 1 and that a value for this item is stored at location "010" (octal) in the memory of the programmable controller 10.

"BOWL POSITION" is a logical bit value representing one of two positions for a "bowl" apparatus as detected by another input device on an assembly line. It shall be assumed that this input device is connected to the programmable controller 11 at Station 2 and that a value for this item is stored at location "010" (octal) in the memory of the programmable controller 11 at Station 2.

"PARTS COUNT C_STATE" is an integer number which is a status code representing one of several collection states for the data item "PARTS COUNT". The actual number of parts would be contained in a value atom for "PARTS COUNT". It shall be assumed that the data for "PARTS COUNT C_STATE" is stored at location "015" (octal) in the memory of the programmable controller 11 at Station 2.

FIG. 9 illustrates that the tagged items, "CAR COUNT", "BOWL POSITION" and "PARTS COUNT C STATE" must be "configured" or added to the database 62 before data can be collected on a change-of-state or other basis. Assuming these atoms are to be added to the database 62 in ACCESS MACHINE 1 after it has been downloaded, the entry of records for these atoms at the work station 41 causes the generation of an "ADD POINT" message 23 containing the information for adding these items to the database 62. This information includes data designating each point as either an "integer" type or a "bit" type for example. The adding of data items to the database 62 during operation of the controlled equipment is referred to as on-line configuration. For the protocols, circuitry and details for generating the "ADD POINT" message 23 and a return message, reference is made to U.S. Pat. application Ser. No. 928,529, filed Nov. 7, 1986.

On the downstream side of the database 62 in FIG. 9, a communications hardware and software interface 63 of the type used with the Data Highway TM networks communicates with the memory locations at the programmable controllers 10 and 11 through transmission and receipt of network messages 64.

Figure 10:
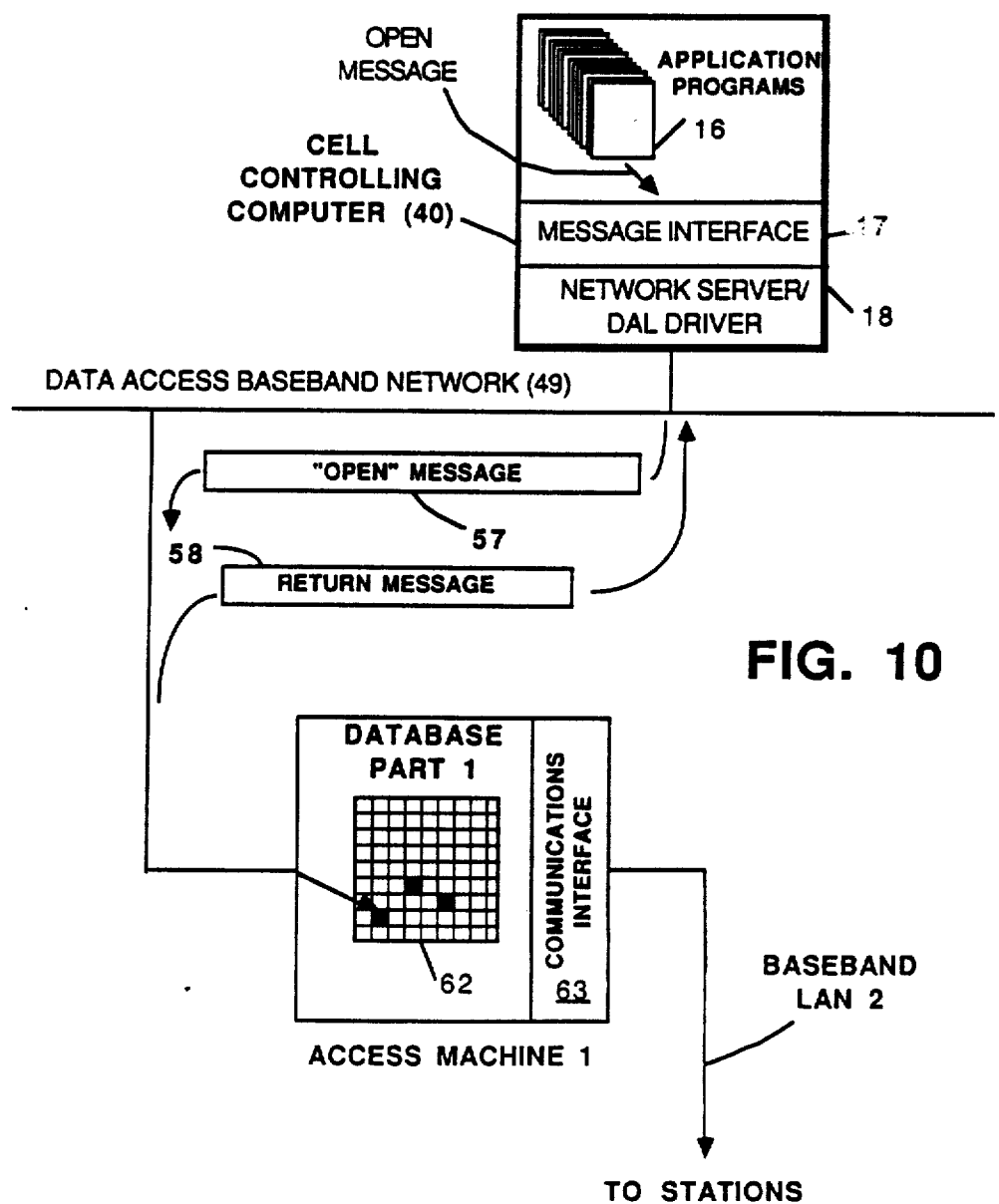
FIG. 10 is a data flow diagram showing the initiation of the change-of-state function in certain data items in the access machine of FIG. 9.

Assuming the tag-referenced items are then resident in ACCESS MACHINE 1, the opening of an application program 16 to monitor these items on the video display generates an "OPEN" message 57 to the network server/DAL driver 18 as seen in FIG. 10. This program process 18 applies a protocol and transmits the "OPEN" message 57 through the data access baseband network 49 to ACCESS MACHINE 1. ACCESS MACHINE 1 replies with an "OPEN" return message 58 to confirm the status of the atoms as subject to "change-of-state" monitoring.

Figure 13:
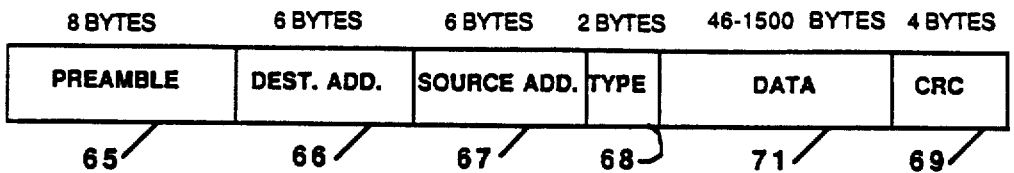
FIGS. 13–18 are maps of the database-related information contained in messages communicated between the cell controlling computer and the access machine in FIGS. 9–12.

As seen in FIG. 13, a message frame for a database operations message, such as the "OPEN" message 57, includes a preamble 65 of eight bytes, followed by a machine-level destination address 66 of six bytes, a machine-level source address 67 of six bytes, and a message type identifier 68 of two bytes. These are included in what will be referred to as a protocol header 70 in the "OPEN" message 57 mapped in FIG. 2. The DST HST field referred to in relation to FIGS. 7a and 7b is determined by the machine-level source address 67 received in this protocol header 70.

The protocol header 70 is followed by message data 71 which may range from 46 bytes up to 1500 bytes. At the tail end of messages transmitted over the data access baseband network 49 is a cyclic redundancy code (CRC) 69 of four bytes, and this will be included in what will be referred to as the protocol tail 72 in FIG. 14.

Figure 14:
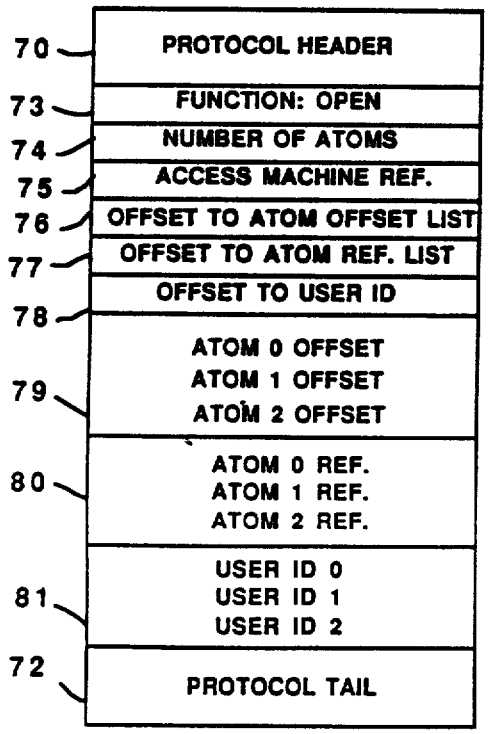

As seen further in FIG. 14, the data in the "OPEN" message 57 includes a first data element which is a function code 73 designating the message as the "OPEN" message 57. This is followed by a data element 74 containing the number of atoms to be "opened" for "change-of-state" monitoring. This is followed by an access machine reference 75 (such as VN1.AM1) that identifies the access machine in which the atoms will reside. This is followed by offset pointers 76, 77, 78 to an atom offset list 79, to an atom reference list 80, and to a list of user ID numbers 81 for the atoms which are being opened for "change-of-state" monitoring. The atom references in this example are "CAR COUNT VALUE", "PARTS COUNT C_STATE" and "BOWL POSITION VALUE". The user ID numbers are the numbers that were described earlier in relation to the C-0-S data table 19 in the cell controlling computer 40 and the C-0-S table 161 in the access machine.

When the "OPEN" message 57 reaches ACCESS MACHINE 1, it is stripped of its protocol overhead by the data link driver 152, and the processor in the DAP module 140 executes instructions in the database management module 154 to set up the C-0-S table 161. The processor in the DAP module 140 also executes instructions to add a change-of-state pointer to each data record in the database 62 which contains atoms identified for change-of-state monitoring in the "OPEN" message 57. The processor n the DAP module 140 also executes instructions to add the change-of-state field 165 to each queue point 176 as described earlier.

Figure 15:
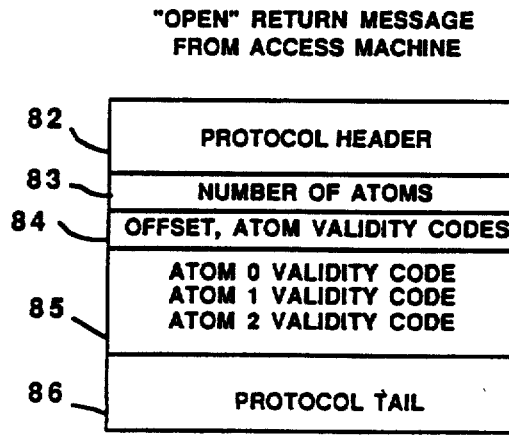

To confirm the receipt and implementation of the "OPEN" message 57, ACCESS MACHINE 1 returns the "OPEN" return message 58 as mapped in FIG. 15. This message 58 includes a return protocol header 82, a data element 83 specifying the number of atoms and an array of atom validity codes 85. If an atom reference is sent for an atom which has not been added to the database 62, the atom validity code is returned with a code for "invalid" status. Data element 84 is an offset pointer to the beginning of the array 85, and the message is terminated by a return protocol tail 86. The return protocol header 83 and tail 86 relate to FIG. 11 in the same manner as the protocol header and tail for the "OPEN" message itself.

Figure 11:
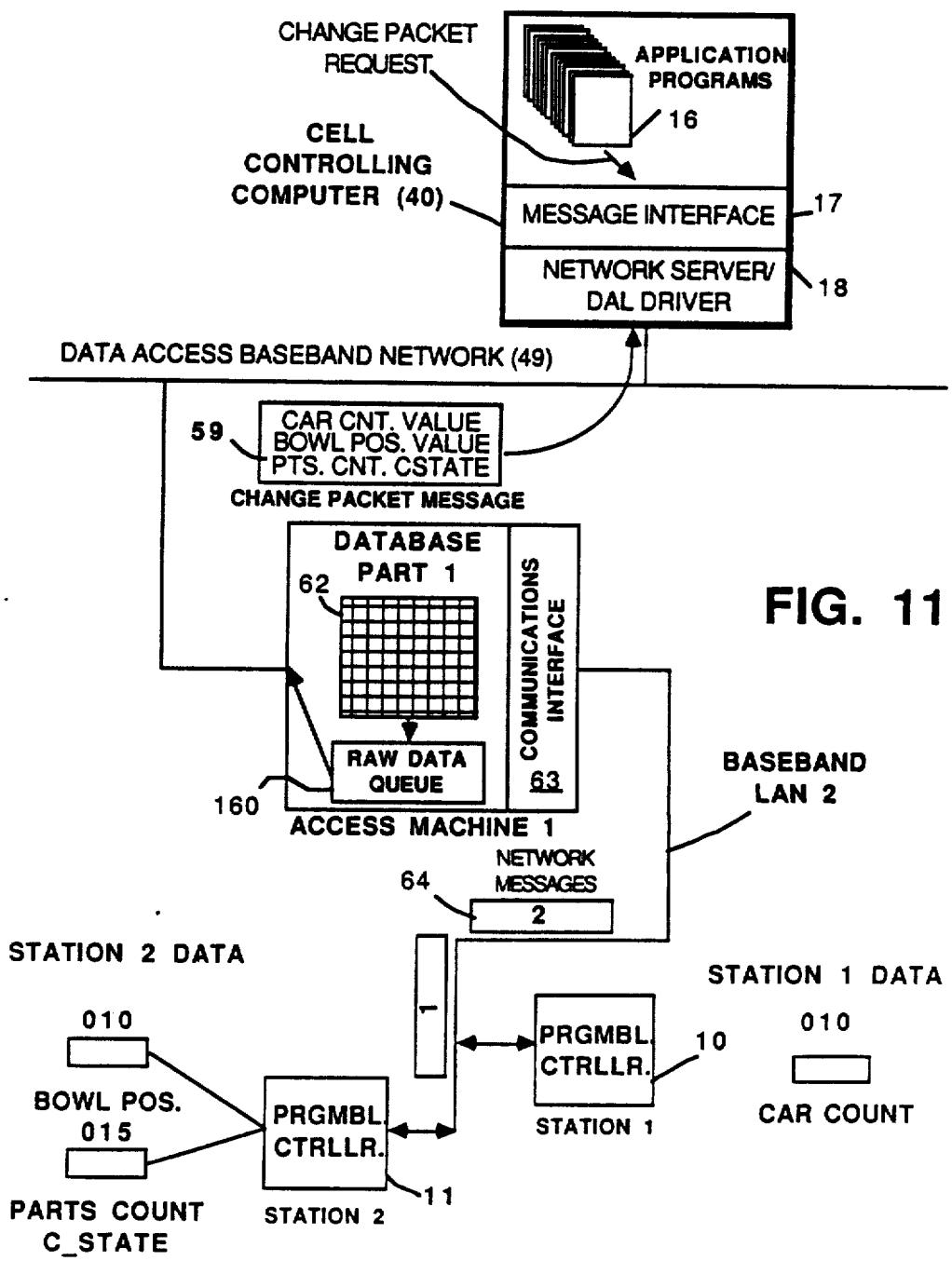
FIG. 11 is a data flow diagram showing the return of unsolicited change packet messages from the access machine of FIG. 9.

As seen in FIG. 11, new data values are received in the database 62 in network messages 64 from station-level devices 10, 11 or from program sources. Besides updating atoms in the database 62, the processor in the DAP module 140 in FIG. 2 executes instructions in the data collection program 155 to duplicate and load the new values into the raw data queue 160 for transmission back to the cell controlling computer 40. The processor in the DAP module 140 then sets a timer for one second and also keeps track of the number of data items in the raw data queue 160. The raw data queue 160 is sized during initialization operations to hold thirty-six (36) changed data items to be reported to the cell controlling computer 40. When one second has elapsed or when thirty-six (36) changed data items have been accumulated in the buffer, whichever occurs first, the database management module 154 initiates action to assemble a change packet. After atoms are "opened" in the database 62, such change packets are sent in unsolicited messages to the cell controlling computer 40, which means that no further messages from the cell controlling computer 40 are needed to obtain the "change packet".

Assuming the above conditions are met for the example begun in FIG. 9—the processor in the DAP module 140 executes the database management module 154 to retrieve initial values for the atoms that have been opened. As shown in FIG. 11 the access machine then transmits a first change packet message 59 that includes updated values for "CAR COUNT VALUE", "BOWL POSITION VALUE" and "PARTS COUNT $C_{13}$ STATE". When the change packet message 59 is received by the cell controlling computer 40, the atoms are updated in the change-of-state table 19 and are displayed or used in some other manner dictated by the application program 16 which called for their update on a change-of-state basis.

During data collection, the updating of values in the database 62 is followed by assembling and transmitting additional change packet messages 59 without prompting from the cell controlling computer 40. Change packet messages will be generated on this basis as long as the data items remain open.

Figure 16:
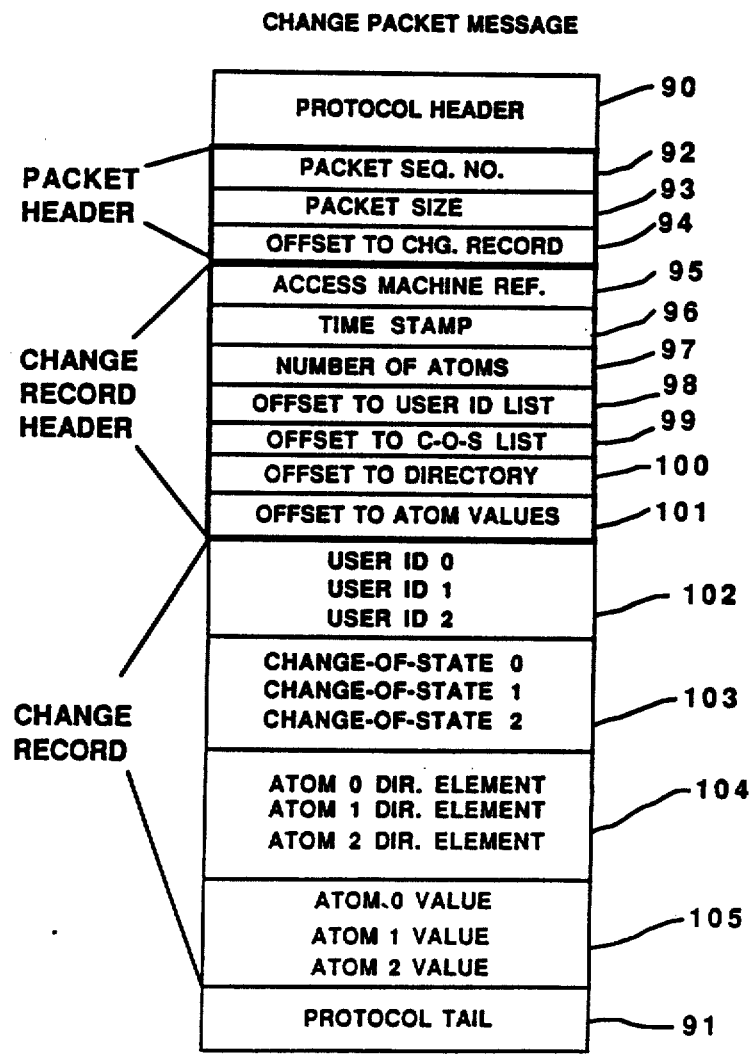

The details of a change packet are mapped in FIG. 16. The protocol header 90 and protocol tail 91 relate to FIG. 13 as described for the "OPEN" message 57. The "data" 71 in the change packet includes a packet header, a change record header and the change data record which are seen in FIG. 16. The packet header more particularly includes data elements 92–94 designating a packet sequence number, a packet size and an offset pointer to the change record. The change packet header follows with data elements 95–101 for an access machine reference identifier, a time stamp, the number of atoms in the change record, and offset pointers to a user ID list applicable to the atoms in the packet, the change-of-state status list, an atom directory list and an atom value list. The change record follows with the actual user ID list 102, the change-of-state status list 103, the atom directory list 104 and the atom value list 105. The change-of-state status list 103 indicates whether a "value" atom is an initial value or a changed value, or whether the atom value was not collected or was an illegal or invalid atom value.

Returning to FIG. 11, there is a change packet request signal that is transmitted from the application program 16 to the message interface 17, but this request is not seen on the data access baseband network 49, and does not generate a message to ACCESS MACHINE 1. When the cell controlling computer 40 receives change data packets it accumulates them until the application program 16 is ready to receive them. The application program 16 signals that it is ready to receive a change packet through the message interface 17 using the change packet request, which can be a message or a signal.

Figure 12:
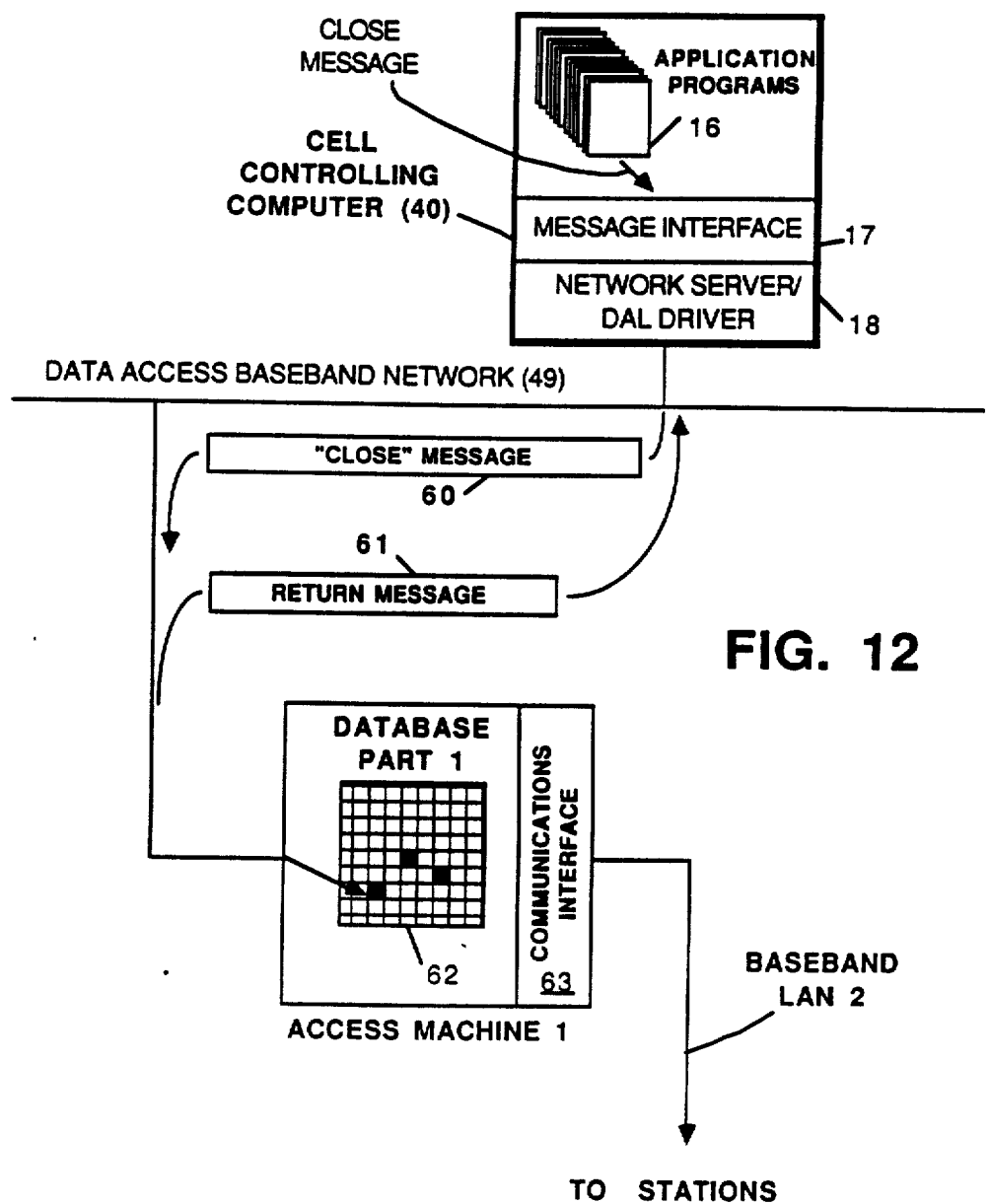
FIG. 12 is a data flow diagram showing the termination of the change-of-state function in the access machine of FIG. 9.

Referring next to FIG. 12, the closing of data items in the database 62 is initiated by the closing of the data items in the application program 16 that were previously opened. The closing of the data items in the application program 16 generates a "CLOSE" message 60 to the network server/DAL driver 18. The network server/DAL driver 18 applies a protocol to the "CLOSE" message 60 and transmits a network "CLOSE" message 59 to ACCESS MACHINE 1 through the data access baseband network 49. ACCESS MACHINE 1 responds with a "CLOSE" return message 61 to confirm the status of the atoms as no longer being subject to "change-of-state" monitoring.

Figure 17:
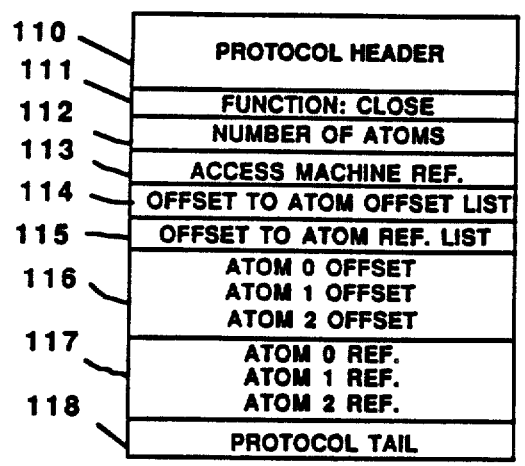
Figure 18:
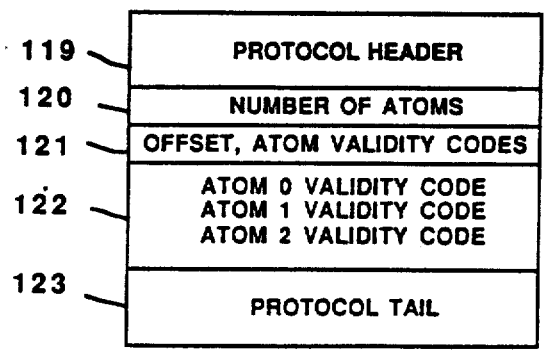

Referring to FIG. 17, the data in the "CLOSE" message 60 is seen in more detail. The data elements 110-118 correspond to the elements for the "OPEN" message 57 with two exceptions. First, the function code element 111 is set for a "CLOSE" function rather than an "OPEN" function. When the atoms are closed in the database 62, neither changed nor unchanged data will be sent back to cell controlling computer 40 without some further database operations message being received from the cell controlling computer 40. Second, the user ID list and its associated pointer are not required for the "CLOSE" message 60. The "CLOSE" return message 61, which is returned by ACCESS MACHINE 1 to the cell controlling computer 40 to acknowledge the carrying out of the close function, is mapped in FIG. 18. It has data elements 119-123 which correspond to data elements 82-86 in the "OPEN" return message 58 in FIG. 15.

This description has been by way of an example of how the invention can be carried out. Those experienced in the art will recognize that various details may be modified in arriving at other detailed embodiments, and that many of these embodiments will come within the scope of the invention. Therefore to apprise the public of the scope of the invention and the embodiments covered by the invention the following claims are made.

I claim:

1. A database cache computer for connection in a factory automation system for improving communication between a user interface computer and a plurality of station-level computers located at a corresponding plurality of stations, the database cache computer comprising:

database means for storing a database of data items collected from the plurality of station-level computers;

first communication means coupled to the database means for communicating the data items through a first communication link to and from the user interface computer via a message including data items from a plurality of station level computers;

second communication means coupled to the database means for collecting the data items through a second communication link from the station-level computers; and wherein an improvement comprises:

means in the database cache computer responsive to a first message from the user interface computer to designate data items as being subject to change-of-state monitoring;

means in the database cache computer for detecting changes in states of the designated data items collected through the second communication link from the plurality of station-level computers; and means in the database cache computer responsive to changes in the states of the designated data items collected through the second communication link from the plurality of station-level computers for assembling and transmitting an unsolicited message to the user interface computer, wherein the unsolicited message includes the changed states originating at a plurality of station-level computers for a plurality of the designated data items.

2. The database cache computer of claim 1, wherein the means responsive to changes in the states of the designated data items generates the unsolicited message to the user interface computer after a monitoring period defined by a time period or defined by the acquisition of a certain number of data items for which states have changed since a previous monitoring period, whichever occurs first.

3. The database cache computer of claim 1, further comprising means responsive to a second message from the user interface computer to delete certain data items in the database cache computer as being subject to change-of-state data monitoring.

4. The database cache computer of claim 1 in which each data item is identified in part by a field of alphanumeric tag data and in which the means for assembling and transmitting the unsolicited message includes means for retrieving the data items from the database means by hash decoding of the alphanumeric tag data.

5. The database cache computer of claim 1, wherein the first communication link is a first local area network.

6. The database cache computer of claim 1, wherein the second communication link is a second local area network.

7. A method for collecting and monitoring data in a multi-tier computer system while reducing message traffic, the method comprising:

opening a data record by executing an application program in a supervisory computer, wherein the data record includes data items to e monitored at one or more station-level computers that are remote from the supervisory computer;

in response to the opening of a data record in the supervisory computer, generating an "open" message from the supervisory computer to a database cache computer that stores a database of data items to be monitored at the one or more station-level computers that are remote form the supervisory computer, wherein the "open" message includes a list of data items to be monitored, and wherein the "open" message identified the data items as being subject to change-of-state monitoring in which only states that have changed for data items within the database within a monitoring period are transmitted back to the supervisory computer;

in response to receiving the "open" message at the database cache computer, monitoring those data items which have been identified in the "open" message as being subject to change-of-state monitoring by receiving update messages from the station-level computers and detecting those states which have changed from last states stored in the database; and transmitting a change data message from the database cache computer to the supervisory computer, wherein the change data message includes only states of data items that have changed since the beginning of the monitoring period.

8. The method of claim 7, wherein in response to the "open" message, those data items which have been identified in the "open" message are monitored for a monitoring period, and wherein the monitoring period is defined as a certain period of time or is defined by the acquisition of a number of data items for which states have changed during the monitoring period, whichever occurs first.

9. The method of claim 7, wherein changed states include initial values, and further comprising the step of collecting initial values for those data items which have been identified in the "open" message and wherein the initial values are included in an initial change data message that is communicated from the database cache computer to the supervisory computer in response to the "open" message.

10. The method of claim 7, further comprising the step of generating a "close" message from the supervisory computer to the database cache computer to delete certain data items in the database cache computer as being subject to change-of-state monitoring.

11. The method of claim 7, wherein the supervisory computer includes a user interface for opening a data record and for viewing the states of data items that have changed since the beginning of the monitoring period.

* * * * *

UNITED STATES PATENT AND TRADEMARK OFFICE
CERTIFICATE OF CORRECTION

PATENT NO. : 4,972,367
DATED : November 20, 1990
INVENTOR(S) : Thomas J. Burke

Page 1 of 3

It is certified that error appears in the above-identified patent and that said Letters Patent is hereby corrected as shown below:

ON TITLE PAGE:

| | | |
|---|---|---|
| In the title | "HIGH" should be --HIGHER--. (Col. 1, line 3) | |
| Col. 4, line 18 | "I/0" should be --I/O--. | |
| Col. 4, line 31 | "(RA)" should be --(RAM)--. | |
| Col. 5, line 45 | "substntially" should be --substantially--. | |
| Col. 6, line 54 | "drive" should be --driver--. | |
| Col. 7, line 6 | "and LAN" should be --an LAN--. | |
| Col. 7, line 36 | "drive" should be --driver--. | |
| Col. 8, line 26 | After "CONVEYOR" add --.--. | |
| Col. 10, line 35 | "COntrolling" should be --controlling--. | |
| Col. 11, line 33 | "remove" should be --remote--. | |
| Col. 11, line 59 | "C-0-S" should be --C-O-S--. | |
| Col. 11, line 60 | "C-0-S" should be --C-O-S--. | |
| Col. 11, line 62 | "C-0-S" should be --C-O-S--. (both occur.) | |
| Col. 11, line 66 | "C-0-S" should be --C-O-S--. | |
| Col. 13, line 34 | "C-0-S" should be --C-O-S--. | |
| Col. 13, line 53 | "C-0-S" should be --C-O-S--. | |

UNITED STATES PATENT AND TRADEMARK OFFICE
CERTIFICATE OF CORRECTION

PATENT NO. : 4,972,367

DATED : November 20, 1990

INVENTOR(S) : Thomas J. Burke

It is certified that error appears in the above-identified patent and that said Letters Patent is hereby corrected as shown below:

| | |
|---|---|
| Col. 14, line 36 | "PARTS COUNT C STATE" should be --PARTS COUNT C_STATE--. |
| Col. 15, line 8 | "FIG. 2" should be --Fig. 12--. |
| Col. 15, line 35 | "C-0-S" should be --C-O-S--. |
| Col. 15, line 36 | "C-0-S" should be --C-O-S--. |
| Col. 15, line 41 | "C-0-S" should be --C-O-S--. |
| Col. 15, line 46 | "n the DAP" should be --in the DAP--. |
| Col. 16, line 24 | "$C_{13}$" should be --C_--. |
| Col. 17, line 57 | "station level" should be --station-level--. |
| Col. 18, line 42 | "to e monitored" should be --to be monitored--. |

UNITED STATES PATENT AND TRADEMARK OFFICE
CERTIFICATE OF CORRECTION

PATENT NO. : 4,972,367

DATED : November 20, 1990

INVENTOR(S) : Thomas J. Burke

It is certified that error appears in the above-identified patent and that said Letters Patent is hereby corrected as shown below:

In the Abstract
1. 14          "database computer" should be --database cache computer--.

Signed and Sealed this

Twenty-first Day of July, 1992

Attest:

DOUGLAS B. COMER

Attesting Officer     Acting Commissioner of Patents and Trademarks